United States Patent
Manthiram et al.

(10) Patent No.: US 11,621,419 B2
(45) Date of Patent: Apr. 4, 2023

(54) COMPOSITE POSITIVE ELECTRODE ACTIVE MATERIAL FOR LITHIUM SECONDARY BATTERY, METHOD OF PREPARING THE SAME, POSITIVE ELECTRODE FOR LITHIUM SECONDARY BATTERY INCLUDING THE SAME, AND LITHIUM SECONDARY BATTERY INCLUDING THE POSITIVE ELECTRODE

(71) Applicants: Samsung SDI Co., Ltd., Yongin-si (KR); Board of Regents, The University of Texas System, Austin, TX (US)

(72) Inventors: Arumugam Manthiram, Austin, TX (US); Youngjin Kim, Austin, TX (US); Byongyong Yu, Yongin-si (KR)

(73) Assignees: Samsung SDI Co., Ltd., Yongin-si (KR); Board of Regents, The University of Texas System, Austin, TX (US)

( * ) Notice: Subject to any disclaimer, the term of this patent is extended or adjusted under 35 U.S.C. 154(b) by 205 days.

(21) Appl. No.: 17/103,315

(22) Filed: Nov. 24, 2020

(65) Prior Publication Data

US 2022/0166015 A1 May 26, 2022

(51) Int. Cl.
*H01M 4/00* (2006.01)
*H01M 4/525* (2010.01)
(Continued)

(52) U.S. Cl.
CPC ........... *H01M 4/525* (2013.01); *H01M 4/366* (2013.01); *H01M 4/485* (2013.01); *H01M 4/505* (2013.01);
(Continued)

(58) Field of Classification Search
CPC ................. H01M 4/366; H01M 4/485; H01M 2004/027; H01M 10/0525; H01M 4/525; H01M 2004/028
See application file for complete search history.

(56) References Cited

U.S. PATENT DOCUMENTS

2019/0326591 A1* 10/2019 Feridun .................. C01G 53/50
2020/0343553 A1 10/2020 Kim et al.

FOREIGN PATENT DOCUMENTS

JP 1999-167919 A 6/1999
JP 4050123 B2 12/2007
(Continued)

OTHER PUBLICATIONS

Noh, et al., "Comparison of the structural and electrochemical properties of layered $Li[Ni_xCo_yMn_z]O_2$ (x=1/3, 0.5, 0.6, 0.7, 0.8 and 0.85) cathode material for lithium-ion batteries", *Journal of Power Sources*, vol. 233 (2017) pp. 121-130.

*Primary Examiner* — Cynthia H Kelly
*Assistant Examiner* — Monique M Wills
(74) *Attorney, Agent, or Firm* — Lewis Roca Rothgerber Christie LLP

(57) ABSTRACT

A method of preparing a composite positive electrode active material for a lithium secondary battery includes surface-treating a nickel-based active material using carbon dioxide to form a lithium carbonate layer on the surface of the nickel-based active material, mixing the nickel-based active material having the lithium carbonate layer on the surface thereof with a metal precursor including at least one metal selected from cobalt (Co), aluminum (Al), magnesium (Mg), and gallium (Ga) to prepare a mixture, and heat-treating the mixture. A composite positive electrode active material for a lithium secondary battery may be obtained according to the method; and used in a positive electrode for a lithium secondary battery.

20 Claims, 17 Drawing Sheets

(51) Int. Cl.
*H01M 4/485* (2010.01)
*H01M 10/0525* (2010.01)
*H01M 4/505* (2010.01)
*H01M 4/36* (2006.01)
*H01M 4/02* (2006.01)

(52) U.S. Cl.
CPC .. *H01M 10/0525* (2013.01); *H01M 2004/027* (2013.01); *H01M 2004/028* (2013.01)

(56) References Cited

FOREIGN PATENT DOCUMENTS

| | | |
|---|---|---|
| JP | 2011-113792 A | 6/2011 |
| KR | 10-2013-0049517 A | 5/2013 |
| KR | 10-2019-0101735 A | 9/2019 |

* cited by examiner

COMPOSITE POSITIVE ELECTRODE ACTIVE MATERIAL FOR LITHIUM SECONDARY BATTERY, METHOD OF PREPARING THE SAME, POSITIVE ELECTRODE FOR LITHIUM SECONDARY BATTERY INCLUDING THE SAME, AND LITHIUM SECONDARY BATTERY INCLUDING THE POSITIVE ELECTRODE

BACKGROUND

1. Field

One or more aspects of embodiments of the present disclosure relate to a composite positive electrode active material for a lithium secondary battery, a method of preparing the same, a positive electrode for a lithium secondary battery including the same, and a lithium secondary battery containing the positive electrode including the same.

2. Description of Related Art

The advancement of portable electronic devices and communication devices highlights a great desire for the development of lithium secondary batteries having high energy density. However, lithium secondary batteries having high energy density may have deteriorated safety, and improvements in this regard are desired.

As a positive electrode active material for a lithium secondary battery, lithium nickel manganese cobalt composite oxide, lithium cobalt oxide, etc. are used. When a coating layer is formed on a surface of such positive electrode active materials through a dry coating method utilizing coating layer forming materials (e.g., without utilizing a solvent), the amounts of the coating layer forming materials are limited, and substantially uniform dispersion of the positive electrode active material and the coating layer forming materials may be difficult to achieve, resulting in little reduction in residual lithium (e.g., residual surface lithium may not be sufficiently reduced). When a coating layer is formed on a surface of a positive electrode active material through a wet coating method utilizing coating layer forming materials, the coating layer forming materials may be substantially uniformly applied on the positive electrode active material, but the capacity of the material may be reduced.

SUMMARY

One or more aspects of embodiments of the present disclosure are directed toward a composite positive electrode active material for a lithium secondary battery having a significant reduction in residual lithium and/or having excellent capacity.

One or more aspects of embodiments of the present disclosure are directed toward a method of preparing the composite positive electrode active material for the lithium secondary battery described above.

One or more aspects of embodiments of the present disclosure are directed toward a lithium secondary battery having improved charge/discharge properties by including a positive electrode containing the composite positive electrode active material described above.

Additional aspects will be set forth in part in the description that follows and, in part, will be apparent from the description, or may be learned by practice of the presented embodiments of the disclosure.

One or more example embodiments of the present disclosure provide a method of preparing a composite positive electrode active material for a lithium secondary battery, the method including:

surface-treating a nickel-based active material utilizing carbon dioxide to form a lithium carbonate layer on the surface of the nickel-based active material (e.g., and forming a lithium carbonate layer on the surface of the nickel-based active material);

mixing the nickel-based active material having the lithium carbonate layer on the surface thereof with a metal precursor including at least one metal selected from cobalt (Co), aluminum (Al), magnesium (Mg), and gallium (Ga) to prepare a mixture; and heat-treating the mixture.

One or more example embodiments of the present disclosure provide a composite positive electrode active material for a lithium secondary battery including a nickel-based active material and a coating layer containing at least one metal material selected from cobalt, aluminum, magnesium, and gallium on a surface of the nickel-based active material, wherein the composite positive electrode active material is obtained by: surface-treating a nickel-based active material utilizing carbon dioxide to form a lithium carbonate layer on a surface of the nickel-based active material (e.g., and forming a lithium carbonate layer on the surface of the nickel-based active material); mixing the nickel-based active material having the lithium carbonate layer on the surface thereof with a metal precursor containing at least one metal selected from cobalt (Co), aluminum (Al), magnesium (Mg), and gallium (Ga) to prepare a mixture; and heat-treating the mixture, and the amount of lithium carbonate in the composite positive electrode active material is 0.3 wt % or less.

The coating layer is in the form of (e.g., is) a substantially continuous coating layer.

One or more example embodiments of the present disclosure provide a positive electrode for a lithium secondary battery containing the composite positive electrode active material.

One or more example embodiments of the present disclosure provide a lithium secondary battery containing the positive electrode described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
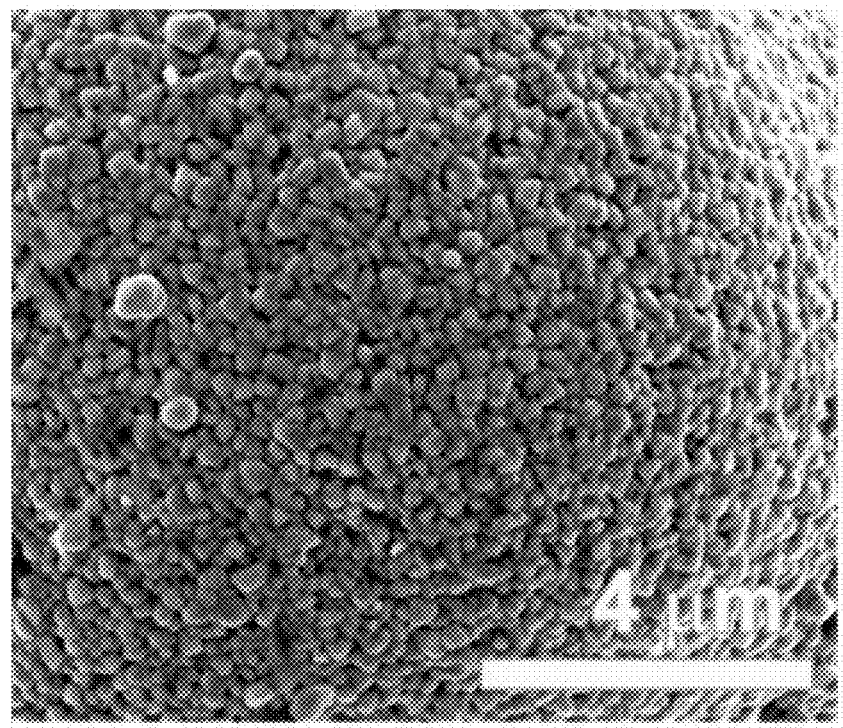
FIG. 1A is an scanning electron microscope (SEM) image of a composite positive electrode active material of Example 1.

Reference will now be made in detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Further, the use of "may" when describing embodiments of the present disclosure refers to "one or more embodiments of the present disclosure".

Hereinafter, a composite positive electrode active material for a lithium secondary battery according to an embodiment, a method of preparing the same, a positive electrode for a lithium secondary battery including the same, and a lithium secondary battery including the positive electrode will be explained in more detail.

When a coating layer is formed (e.g., deposited) on a surface of a positive electrode active material, either a dry coating method or a wet coating method may be used. When a dry coating method is used, the core positive electrode active material and the coating layer material may not be uniformly (e.g., sufficiently) dispersed. When a wet coating method is used to overcome the lack of sufficient dispersion, the reaction between the positive electrode active material and the coating layer-forming material may more effectively allow a coating layer to be substantially uniformly formed on the surface of the positive electrode active material and may reduce the amount of residual lithium (e.g., on the surface of the positive electrode active material), but may also cause a reduction in capacity of the core positive electrode active material, and thus, improvements in this regard are desired.

Example embodiments of the present disclosure provide a method of preparing a novel composite positive electrode active material to achieve a reduction (e.g., significant reduction) in residual lithium without capacity reduction, and a composite positive electrode active material obtained through the method.

A method of preparing a composite positive electrode active material according to an embodiment of the present disclosure includes surface-treating a nickel-based active material utilizing carbon dioxide to form a lithium carbonate layer on the surface of the nickel-based active material (e.g., and forming a lithium carbonate layer on the surface of the nickel-based active material), mixing the nickel-based active material having the lithium carbonate layer on the surface thereof with at least one metal precursor including at least one metal selected from cobalt (Co), aluminum (Al), magnesium (Mg), and gallium (Ga) to prepare a mixture, and heat-treating the mixture.

The lithium carbonate layer may be formed from the surface treatment utilizing carbon dioxide, and may have a form of a substantially continuous coating layer. When the surface treatment utilizing carbon dioxide is performed, the carbon dioxide may be provided at a concentration of about 1 wt % to about 10 wt %, about 1.2 wt % to about 9 wt %, or for example, about 1.5 wt % to about 8 wt % by weight with respect to a total weight of treatment gas (e.g., including a carrier gas such as nitrogen), and a flow rate of about 0.1 L/min to about 1 L/min, about 0.12 L/min to about 0.9 L/min, or for example, about 0.15 L/min to about 0.8 L/min. When the concentration and flow rate of carbon dioxide are within the above ranges, excess residual lithium (e.g., residual Li present or remaining on the surface after synthesis of the positive active material) may be effectively turned (e.g., converted) into lithium carbonate. As a result, the lithium carbonate layer may be substantially uniformly formed on the surface of the nickel-based active material in the form of a substantially continuous coating layer.

When the nickel-based active material is surface-treated utilizing carbon dioxide, the surface treatment may be performed at about 30° C. to about 60° C., about 40° C. to about 55° C., or about 45° C. to about 50° C. When the surface treatment is performed in the above temperature range, the lithium carbonate layer may be substantially uniformly formed on the surface of the nickel-based active material in the form of a substantially continuous coating layer, thereby providing improvements in reduction of residual lithium.

The metal precursor may be a cobalt precursor, an aluminum precursor, a magnesium precursor, a gallium precursor, or a combination thereof. The cobalt precursor may be, for example, cobalt hydroxide, cobalt chloride, cobalt sulfate, cobalt oxide, or a combination thereof. The aluminum precursor may be aluminum hydroxide, aluminum chloride, aluminum sulfate, aluminum oxide, or a combination thereof; and the magnesium precursor may be magnesium hydroxide, magnesium chloride, magnesium sulfate, magnesium oxide, or a combination thereof. The gallium precursor may be gallium nitrate, gallium hydroxide, gallium oxide, gallium sulfate, gallium chloride, or a combination thereof.

The amount of the metal precursor may be stoichiometrically adjusted to obtain a desired or suitable composite positive electrode active material, and the amount may be, for example, about 1 mol % to about 20 mol %, about 1 mol % to about 10 mol %, or about 1.5 mol % to about 8 mol %, with respect to 100 mol % of the total amount of the nickel-based active material and the metal precursor.

The mixing of the nickel-based active material having a lithium carbonate layer on the surface thereof with the metal precursor to prepare a mixture may be performed by mixing the nickel-based active material having the lithium carbonate layer formed on the surface thereof with a metal precursor including at least one metal selected from cobalt, aluminum, magnesium, and gallium. The metal precursor may be, for example, a cobalt precursor.

The mixing of the nickel-based active material with the metal precursor may be, for example, dry mixing (e.g., a dry mixing process). The dry mixing may be a physical mixing process. The term "physical mixing" may refer to mixing using a blender, or mechanical milling using a ball mill, etc.

The heat-treating the mixture of the nickel-based active material and the metal precursor may be performed at about 600° C. to about 750° C., about 620° C. to about 740° C., or for example, about 650° C. to about 720° C. in an air or oxygen atmosphere. When the heat treatment is performed in the above range, a coating layer containing at least one metal material including cobalt, aluminum, magnesium, and/or gallium may be formed on the surface in the form of a substantially continuous coating layer.

One or more example embodiments of the present disclosure provide a composite positive electrode active material for a lithium secondary battery obtained according to the preparation method described above.

The composite positive electrode active material for a lithium secondary battery according to an embodiment includes a nickel-based active material and a coating layer including at least one metal material including cobalt, aluminum, magnesium, and gallium positioned on a surface of the nickel-based active material. The amount of lithium carbonate in the composite positive electrode active material may be 0.3 wt % or less (e.g., with respect to 100 wt % of the composite positive electrode active material), and the metal material-containing coating layer (e.g., the coating layer including at least one metal material) may be present in the form of a substantially continuous coating layer.

When the amount of lithium carbonate in the composite positive electrode active material is greater than 0.3 wt %, the amount of carbon dioxide gas generated during high temperature storage may increase, causing a deterioration in safety of lithium secondary batteries.

The amount of lithium carbonate in the composite positive electrode active material is, for example, 0.3 wt % or less, 0.2 wt % or less, about 0.05 wt % to about 0.2 wt %, or about 0.1 wt % to about 0.15 wt %. The amount of lithium hydroxide in the composite positive electrode active material is, for example, 0.4 wt % or less, 0.37 wt % or less, 0.3 wt % or less, about 0.05 wt % to about 0.2 wt %, or about 0.1 wt % to about 0.15 wt %.

The amounts of residual lithium carbonate and/or residual lithium in the composite positive electrode active material according to an embodiment may be reduced (e.g., decreased) compared to positive electrode active materials in the related art, because the lithium carbonate layer substantially uniformly formed on the surface of the nickel-based active material reacts with the metal precursor (e.g., cobalt precursor) to cause the lithium carbonate to be barely present in a final product (e.g., so that the amount of unreacted residual lithium, for example in the form of lithium carbonate, is reduced). As used herein, "the amount of residual lithium" refers to the sum of the amounts of lithium carbonate and lithium hydroxide. The amounts of lithium carbonate and lithium hydroxide may be evaluated according to an acid-base titration method.

The metal material-containing coating layer may include, for example, cobalt (e.g., cobalt metal), cobalt oxide, lithium cobalt oxide, aluminum (e.g., aluminum metal), aluminum oxide, lithium aluminum oxide, magnesium (e.g., magnesium metal), magnesium oxide, lithium magnesium oxide, gallium (e.g., gallium metal), gallium oxide, lithium gallium oxide, or a combination thereof.

According to an embodiment, the metal material-containing coating layer may be a cobalt-based material-containing coating layer (e.g., a coating layer including cobalt and/or a cobalt compound). The cobalt-based material-containing coating layer may include cobalt (e.g., cobalt metal), cobalt oxide, lithium cobalt oxide, or a combination thereof, and a composition of the cobalt-based material-containing coating layer may be analyzed through energy-dispersive X-ray spectroscopy (TEM-EDAX). In some embodiments, the cobalt-based material-containing coating layer may have a form of a substantially continuous coating layer, and the coating layer may have, for example, a thickness of about 1 nm to about 50 nm, about 2 nm to about 30 nm, or about 5 nm to 15 about nm.

In the composite positive electrode active material according to an embodiment, the amount of the metal material in the coating layer may be about 1 mol % to about 20 mol %, or about 1.5 mol % to about 10 mol % with respect to 100 mol % of the total composite positive electrode active material. When the amount of the metal material is within the above range, the amount of residual lithium of the composite positive electrode active material may decrease, and battery lifespan and/or capacity properties may be improved.

In the disclosure, the nickel-based active material may be, for example, a compound represented by Formula 1:

$$\text{Li}_a(\text{Ni}_{1-x-y-z}\text{Co}_x\text{M1}_y\text{M2}_z)\text{O}_{2\pm\alpha1}.\qquad\text{Formula 1}$$

In Formula 1, M1 may be manganese, aluminum, or a combination thereof,

M2 may be an element selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr), and $0.95 \leq a \leq 1.1$, $0.3 \leq (1-x-y-z)<1$, $0<x<1$, $0 \leq y<1$, $0 \leq z<1$, and $0 \leq \alpha 1 \leq 0.1$.

According to an embodiment, in Formula 1, x may be 0.1 to 0.3, y may be 0.05 to 0.3, and z may be 0. The amount of nickel in Formula 1 may be about 30 mol % to about 99 mol %, about 50 mol % to about 95 mol %, about 60 mol % to about 95 mol %, or about 80 mol % to about 92 mol %.

The peak intensity ratio (I(003)/I(104)) (e.g., ratio of an intensity of first peak corresponding to the (003) plane to an intensity of a second peak corresponding to a (104) plane) obtained from X-ray diffraction analysis of the composite positive electrode active material may be 1.3 or greater. The peak corresponding to the (003) plane may have a 2θ of about 18° to 19°, and the peak corresponding to the (104) plane may have a 2θ of about 44.5°.

The ($I_{(003)}/I_{(104)}$) value may be, for example, about 1.3 to about 1.34, and when the I(003)/I(104) is in the above range, a cation mixing ratio may be relatively reduced, and a lithium secondary battery including the composite positive electrode active material may have improved capacity and/or lifespan.

The composite positive electrode active material may have a size of, for example, about 5 μm to about 25 μm, or about 8 to about 20 μm. The nickel-based active material having the lithium carbonate layer may have a size of, for example, about 5 μm to about 25 μm, or about 8 to about 20 μm.

When the composite positive electrode active material and the nickel-based active material each have the above-described size, it becomes easier to use lithium ions in the nickel-based active material obtained from the nickel-based active material precursor (e.g., lithium ions from the nickel-based active material may be more readily available for or during battery operation). Here, the term "size" may refer to an average particle diameter when the composite positive electrode active material is substantially spherical, or may refer to an average long axis length when the composite positive electrode active material is non-spherical (e.g., elongated along one axis compared to the other axes). The size may be measured using a particle size analyzer (PSA) and/or a scanning electron microscope (SEM).

When time-of-flight secondary ion mass spectrometry (TOF-SIMS) is performed on the composite positive electrode active material according to an embodiment, the form, structure and composition of the composite positive electrode active material may be analyzed. For example, TOF-SIMS may be used to analyze the presence of at least one metal (e.g., metal element) selected from cobalt (Co), aluminum (Al), magnesium (Mg), and gallium (Ga) on a surface of the particles.

A time-of-flight secondary ion mass spectrometry (TOF-SIMS) apparatus may have a TOF mass analyzer mounted in SIMS equipment. The SIMS equipment analyzes ions (cations and/or anions) (e.g., secondary ions) released when primary ions collide with a surface of an analyte to obtain the chemical composition and/or surface structure of the analyte. The TOF mass analyzer may have a high ion passing rate and excellent mass resolution so that the mass of each ion is measured at substantially the same time. The TOF-SIMS equipment forms secondary ions of analytically useful molecules to directly obtain information on analytes, has high sensitivity to elements as well as molecules (e.g., elemental and molecular analytes), and has high spatial resolution through a finely focused ion beam.

The composite positive electrode active material according to an embodiment may be, for example, a compound represented by Formula 2 or a compound represented by Formula 3.

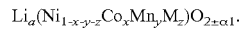

$$Li_a(Ni_{1-x-y-z}Co_xMn_yM_z)O_{2\pm\alpha 1}. \qquad \text{Formula 2}$$

In Formula 2, M is an element selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr), and $0.95 \leq a \leq 1.1$, $0.3 \leq (1-x-y-z)<1$, $0<x<1$, $0 \leq y<1$, $0 \leq z<1$, and $0 \leq \alpha 1 \leq 0.1$.

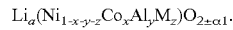

$$Li_a(Ni_{1-x-y-z}Co_xAl_yM_z)O_{2\pm\alpha 1}. \qquad \text{Formula 3}$$

In Formula 3 above, M may be an element selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr), and $0.95 \leq a \leq 1.1$, $0.3 \leq (1-x-y-z)<1$, $0<x<1$, $0 \leq y<1$, $0 \leq z<1$, and $0+\alpha 1 \leq 0.1$.

In Formulae 2 and 3, $1.0 \leq a \leq 1.3$ and $0<x \leq 1/3$, and $0 \leq y \leq 0.5$, $0 \leq z \leq 0.05$, and $1/3 \leq (1-x-y-z) \leq 0.95$ are satisfied. In some embodiments, for example, in Formulas 2 and 3, a may be 1 to 1.1, x may be 0.1 to 0.3, y may be 0.05 to 0.3, and z may be 0.

The amount of nickel in each of Formulae 2 and 3 may be about 30 mol % to about 99 mol %, about 50 mol % to about 95 mol %, about 60 mol % to about 95 mol %, or about 80 mol % to about 92 mol %.

The composite positive electrode active material may be, for example, $LiNi_{0.91}Co_{0.06}Mn_{0.03}O_2$, $LiNi_{0.91}Co_{0.06}Al_{0.03}O_2$, $LiNi_{0.8}Co_{0.2}Mn_{0.2}O_2$, $LiNi_{0.8}Co_{0.2}Al_{0.2}O_2$, $LiNi_{0.6}Co_{0.2}Mn_{0.2}O_2$, $LiNi_{0.7}Co_{0.15}Mn_{0.15}O_2$, $LiNi_{0.7}Co_{0.1}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

The nickel-based active material may be prepared from any suitable nickel-based active material precursor according to a method of preparing a nickel-based active material.

A nickel-based active material may be prepared, for example, by mixing a lithium precursor and a nickel-based active material precursor at a set or desired molar ratio, and performing a primary heat treatment on the mixture.

As a lithium precursor, for example, lithium hydroxide, lithium fluoride, lithium carbonate, or a mixture thereof may be used. The mixing ratio of the lithium precursor to the nickel-based active material precursor may be stoichiometrically controlled or selected to prepare the nickel-based active material of Formula 2 above.

The mixing of the lithium precursor and the nickel-based active material precursor may be dry mixing (e.g., a dry mixing process), and may be performed using a blender, etc. In some embodiments, the dry mixing may be performed using milling (e.g., ball milling). The milling conditions are not particularly limited, but the milling may be performed so that deformation (such as pulverization) of the precursors (used as starting materials) is barely caused (e.g., minimized or decreased). A size of the lithium precursor mixed with the nickel-based active material precursor may be controlled or selected in advance. The lithium precursor may have a size (an average particle diameter) of about 5 μm to about 15 μm, for example, about 10 μm. A lithium precursor having such a size may be milled at about 300 rpm to about 3,000 rpm with the nickel-based active material precursor to obtain a desired or suitable mixture. In the milling process, when a temperature inside the blender is 30° C. or higher, a cooling process may be performed to keep the temperature inside the blender at or near a room temperature of 25° C.

The primary heat treatment may be performed in an air or oxygen atmosphere. The primary heat treatment may be performed at about 600° C. to about 800° C., for example, about 650° C. to about 800° C.

The method of preparing a nickel-based active material may further include performing a secondary heat treatment in an air or oxygen atmosphere after the primary heat treatment. For example, the secondary heat treatment may be performed at about 700° C. to about 900° C.

One or more example embodiments of the present disclosure provide a positive electrode including the composite positive electrode active material for a lithium secondary battery described above.

One or more example embodiments of the present disclosure provide a lithium secondary battery including the positive electrode described above, a negative electrode, and an electrolyte positioned therebetween.

The method of preparing a lithium secondary battery is not particularly limited, and any suitable method available in the related art may be used. For example, the lithium secondary battery may be prepared utilizing the method described below.

A positive electrode and a negative electrode may be prepared by applying and drying a composition for forming a positive electrode active material layer and a composition for forming a negative electrode active material layer on separate and respective current collectors.

A positive electrode active material layer may thus be formed on the positive electrode current collector, and a negative electrode active material layer may thus be formed on the negative electrode current collector.

The composition for forming a positive electrode active material may be prepared by mixing a positive electrode active material, a conductive agent, a binder, and a solvent, and the composite positive electrode active material according to an embodiment may be used as the positive electrode active material.

Non-limiting examples of the positive electrode binder may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluorine rubber, various copolymers thereof, etc., and one alone or a mixture of two or more may be used.

The conductive agent may be used without particular limitation as long as it has conductivity without causing unwanted chemical changes in a battery, and for example, graphite (such as natural graphite and/or artificial graphite); carbon-based materials (such as carbon black, acetylene black, ketjen black, channel black, furnace black, lamp black, and/or thermal black); conductive fibers (such as carbon nanotubes, carbon fibers, and/or metal fibers); carbon fluoride; metal powder (such as aluminum and/or nickel powder); conductive whiskers (such as zinc oxide and/or potassium titanate); conductive metal oxides (such as titanium oxide); and conductive materials (e.g., organic materials) (such as polyphenylene derivatives) may be used.

The amount of the conductive agent may be about 1 to 10 parts by weight, or 1 to 5 parts by weight, with respect to 100 parts by weight of the positive electrode active material. When the amount of the conductive agent is within the above range, the final electrode may have excellent conductivity properties.

As a non-limiting example, N-methylpyrrolidone, etc. may be used as the solvent, and the amount of the solvent may be 20 to 200 parts by weight with respect to 100 parts by weight of the positive electrode active material. When the amount of the solvent is within the above range, the operation for forming the positive electrode active material layer is easy (e.g., the positive electrode active material layer may be easily formed).

The positive electrode current collector may have a thickness of about 3 μm to about 500 μm, and is not particularly limited (e.g., in composition) as long as it has high conductivity without causing unwanted chemical changes in a battery; and for example, stainless steel, aluminum, nickel, titanium, heat-treated carbon, or aluminum or stainless steel that is surface-treated with one of carbon, nickel, titanium, silver, etc. may be used. Fine irregularities may be formed or included on the surface of the current collector to improve the adhesion of the positive electrode active material, and the current collector may be provided in any suitable form (format) (such as a film, a sheet, a foil, a net, a porous body, a foam body, and/or a non-woven fabric body).

Separately, a negative electrode active material, a binder, and a solvent may be mixed to prepare the composition for forming a negative electrode active material layer.

As a negative electrode active material, a material capable of absorbing and desorbing (e.g., intercalating and deintercalating) lithium ions is used. Non-limiting examples of the negative electrode active material include a carbon-based material (such as graphite and/or carbon), lithium metal, an alloy thereof (e.g., a lithium metal alloy), a silicon oxide-based material, etc.

Non-limiting examples of a binder for a negative electrode include polyvinylidene fluoride-hexafluoropropylene copolymer (PVDF-co-HFP), polyvinylidenefluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluorine rubber, polyacrylic acid, various kinds of binder polymers (such as polymers prepared by substituting hydrogen atoms with Li, Na or Ca, and/or various copolymers), etc.

The composition for forming the negative electrode active material layer may further include a thickener. At least one among carboxymethyl cellulose (CMC), carboxyethyl cellulose, starch, regenerated cellulose, ethyl cellulose, hydroxymethyl cellulose, hydroxyethyl cellulose, hydroxypropyl cellulose, styrene butadiene rubber (SBR), and polyvinyl alcohol may be used as the thickener, and for example, CMC may be used.

The negative electrode active material layer may further include a conductive agent as suitable. The conductive agent may be used without particular limitation as long as it has conductivity without causing unwanted chemical changes in a battery, and for example, may include graphite (such as natural graphite and/or artificial graphite); carbon-based materials (such as carbon black, acetylene black, ketjen black, channel black, furnace black, lamp black, and/or thermal black); conductive fibers (such as carbon fibers and/or metal fibers); conductive tubes (such as carbon nanotubes); metal powder (such as carbon fluoride, aluminum, and/or nickel powder); conductive whiskers (such as zinc oxide and/or potassium titanate); conductive metal oxides (such as titanium oxide); conductive materials (e.g., conductive organic materials, such as polyphenylene derivatives); etc. may be used. In some embodiments, the conductive agent may be carbon black, and for example, may be carbon black having an average particle diameter of several tens of nanometers.

The conductive agent may be 0.01 to 10 parts by weight, 0.01 to 5 parts by weight, or 0.1 to 2 parts by weight, with respect to 100 parts by weight of the total weight of the negative electrode active material layer.

The amount of the solvent may be 100 to 300 parts by weight with respect to 100 parts by weight of the total weight of the negative electrode active material. When the amount of the solvent is within the above range, the operation for forming the negative electrode active material layer may be easy (e.g., the negative electrode active material layer may be easily formed).

The negative electrode current collector may be generally formed to have a thickness (e.g., an average thickness) of about 3 μm to about 500 μm. The negative electrode current collector is not particularly limited (e.g., in material) as long as it has high conductivity without causing unwanted chemical changes in a battery, and for example, copper, stainless steel, aluminum, nickel, titanium, heat-treated carbon, or copper or stainless steel that is surface-treated with one of carbon, nickel, titanium, silver, etc. may be used. Similar to the positive electrode current collector, fine irregularities may be formed on the surface thereof to improve the adhesion of the negative electrode active material, and the negative electrode collector may have any suitable forms (format) (such as a film, a sheet, a foil, a net, a porous body, a foam body, and/or a non-woven fabric body).

A separator may be positioned between the positive electrode and the negative electrode prepared according to the process above.

The separator may have a pore diameter of about 0.01 μm to about 10 μm and generally a thickness (e.g., an average thickness) of about 5 μm to about 30 μm. As non-limiting examples, an olefin-based polymer such as polypropylene and polyethylene; or a sheet or non-woven fabric formed of glass fibers is used. When a solid electrolyte such as a polymer is used as an electrolyte, the solid electrolyte may also serve as a separator.

A lithium salt-containing non-aqueous electrolyte may be formed of a non-aqueous electrolyte and a lithium salt. A non-aqueous electrolyte solution, an organic solid electrolyte, and/or an inorganic solid electrolyte, etc. may be used as the non-aqueous electrolyte.

Non-limiting examples of the solvent used in the non-aqueous electrolyte solution include aprotic organic solvents (such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, N,N-formamide, N,N-dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, and/or ethyl propionate).

Non-limiting examples of the organic solid electrolyte include polyethylene derivatives, polyethylene oxide derivatives, polypropylene oxide derivatives, phosphate ester polymers, polyester sulfide, polyvinyl alcohol, polyvinylidene fluoride, etc.

Non-limiting examples of the inorganic solid electrolyte include nitrides, halides, and sulfates of Li, etc. (such as $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and/or $Li_3PO_4$—$Li_2S$—$SiS_2$).

The lithium salt may be readily soluble in the non-aqueous electrolyte, and non-limiting examples include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic carboxylic acid lithium, lithium tetraphenylborate, imide, etc.

Figure 8:
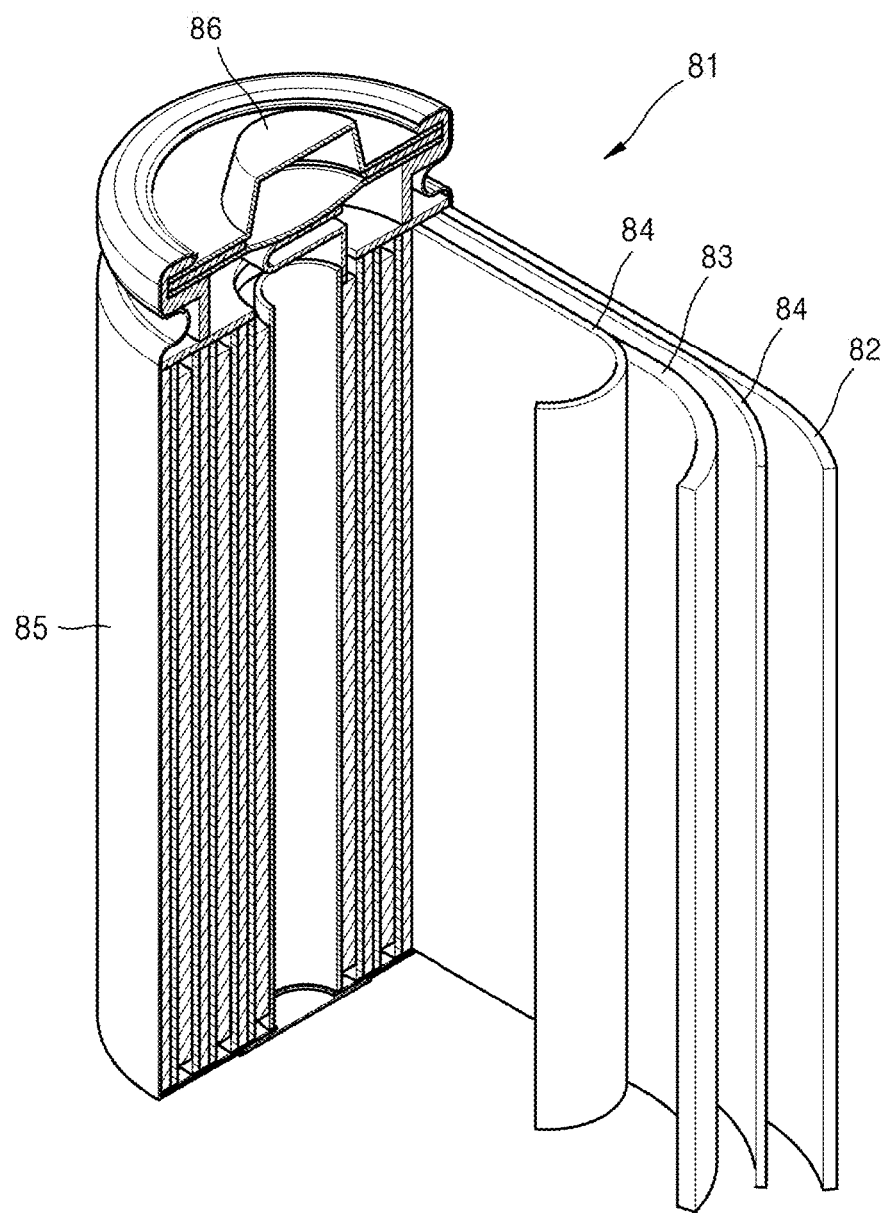
FIG. 8 is a schematic diagram of a lithium secondary battery according to an example embodiment.

FIG. 8 is a schematic cross-sectional view illustrating a typical structure of a lithium secondary battery according to an embodiment.

Referring to FIG. 8, a lithium secondary battery 81 includes a positive electrode 83, a negative electrode 82, and a separator 84. An electrode assembly in which the positive electrode 83, the negative electrode 82, and the separator 84 are wound or folded is accommodated in a battery case 85. The positive electrode 83 contains the composite positive electrode active material according to embodiments of the present disclosure. The separator may be positioned between the positive electrode and the negative electrode within the shape of the battery to form an alternately stacked battery structure. Subsequently, an organic electrolyte is injected into the battery case 85 and sealed with a cap assembly 86 to prepare the lithium secondary battery 81. In some embodiments, the battery case 85 may be a cylindrical, rectangular, or thin-film type, etc. For example, the lithium secondary battery 81 may be a large-sized thin film type battery. The lithium secondary battery may be a lithium ion battery. In some embodiments, the battery structure may be accommodated in a pouch, and then impregnated with the organic electrolyte and sealed to prepare a lithium ion polymer battery. In some embodiments, a plurality of the battery structures may be stacked to form a battery pack, which can be used in devices requiring high capacity and high output. For example, the battery pack may be used for laptops, smartphones, electric vehicles, etc.

The lithium secondary battery may have excellent storage stability at high temperatures, good lifespan, and high rate properties, and may be suitably used for an electric vehicle (EV). For example, the lithium secondary battery may be used in hybrid vehicles (such as plug-in hybrid electric vehicles (PHEV)).

The Examples and Comparative Examples are described in detail below. However, the Examples are presented as an example, and embodiments of the present disclosure are not limited thereto.

Preparation of Nickel-Based Active Materials

COMPARATIVE EXAMPLE 1

Nickel sulfate, cobalt sulfate, and manganese sulfate were stoichiometrically mixed as starting materials to obtain a composite positive electrode active material ($LiNi_{0.91}Co_{0.06}Mn_{0.03}O_2$).

Nickel sulfate, cobalt sulfate, and manganese sulfate were dissolved in distilled water at a concentration of 2 M to obtain a precursor mixture. $NH_4OH$ as a chelating agent and NaOH as a precipitating agent were added to this precursor mixture, and the resultant was subjected to a co-precipitation reaction at 60° C. for 4 hours to obtain a composite metal hydroxide ($Ni_{0.91}Co_{0.06}Mn_{0.03}(OH)_2$) in the form of a precipitate.

Lithium hydroxide (LiOH) was added to the composite metal hydroxide ($Ni_{0.91}Co_{0.06}Mn_{0.03}(OH)_2$), mixed at a molar ratio of 1:1 in a dry system, and the resultant was subjected to heat treatment at about 700° C. for 6 hours in an oxygen atmosphere to obtain a nickel-based active material ($LiNi_{0.91}Co_{0.06}Mn_{0.03}O_2$).

The nickel-based active material was washed with distilled water ("water washing") and dried at 150° C. in vacuum so as to prepare a nickel-based active material, "UT bare".

COMPARATIVE EXAMPLE 2

A nickel-based active material, "UT-$CO_3$" ($LiNi_{0.91}Co_{0.06}Mn_{0.03}O_2$), was obtained in substantially the same manner as in Comparative Example 1, except that a mixture of lithium hydroxide (LiOH) and $Li_2CO_3$ at a molar ratio of 8:1 was used instead of lithium hydroxide (LiOH).
Preparation of Composite Positive Electrode Active Materials

EXAMPLE 1

Preparation of Composite Positive Electrode Active Materials

Carbon dioxide was supplied at a relative humidity of 60%, a concentration of 5 wt %, and a flow rate of 0.5 L/min to a reactor containing the nickel-based active material ($LiNi_{0.91}Co_{0.06}Mn_{0.03}O_2$) obtained according to Comparative Example 1, and the resultant was subjected to primary heat treatment at 50° C. for 18 hours to prepare a nickel-based active material (intermediate) "UT-$CO_2$" having a lithium carbonate layer on the surface thereof.

The nickel-based active material UT-$CO_2$ ($LiNi_{0.91}Co_{0.06}Mn_{0.03}O_2$) having a lithium carbonate layer on the surface thereof was physically mixed with cobalt hydroxide $Co(OH)_2$, and the resultant was subjected to secondary heat treatment at 720° C. for 6 hours to obtain a composite positive electrode active material "UT-$CO_2$—Co" having a coating layer containing lithium cobalt oxide. In this case, the amount of $Co(OH)_2$ is 4 mol % with respect to 100 mol % of the total amount of the nickel-based active material and cobalt hydroxide.

EXAMPLES 2 AND 3

A composite positive electrode active material was prepared in substantially the same manner as in Example 1, except that primary heat treatment was performed at 30° C. and 60° C., respectively, instead of 50° C. in the preparation of the nickel-based active material UT-$CO_2$ having a lithium carbonate layer formed on the surface thereof.

EXAMPLES 4 AND 5

A composite positive electrode active material was prepared substantially in the same manner as in Example 1, except that the amount of cobalt hydroxide $Co(OH)_2$ was changed to 1 mol % and 20 mol %, respectively.

EXAMPLES 6 TO 8

A composite positive electrode active material was prepared in substantially the same manner as in Example 1, except that aluminum hydroxide $Al(OH)_3$, magnesium hydroxide $Mg(OH)_2$, and gallium nitrate $Ga(NO)_3$ were respectively used instead of cobalt hydroxide $Co(OH)_2$.

COMPARATIVE EXAMPLE 3

The nickel-based active material UT bare of Comparative Example 1 and cobalt hydroxide $Co(OH)_2$ were mixed, and the mixture was then subjected to heat treatment at 720° C. for 6 hours to obtain a positive electrode active material "UT-Co". In this case, the amount of $Co(OH)_2$ is 4 mol % with respect to 100 mol % of the total amount of the nickel-based active material and cobalt hydroxide.

COMPARATIVE EXAMPLE 4

The nickel-based active material UT-$CO_3$ having the lithium carbonate layer of Comparative Example 2 on the surface thereof and cobalt hydroxide $Co(OH)_2$ were mixed, and the mixture was then subjected to heat treatment at 720° C. for 6 hours to obtain a positive electrode active material "UT-$CO_3$—Co". In this case, the amount of Co(OH)2 is 4 mol % with respect to 100 mol % of the total amount of the nickel-based active material and cobalt hydroxide.
Preparation of Lithium Secondary Batteries

PREPARATION EXAMPLE 1

Preparation of Coin Cells

As a positive electrode active material, the composite positive electrode active material obtained according to Example 1 was used to prepare coin cells as follows.

Air bubbles were removed from a mixture of 96 g of the composite positive electrode active material obtained according to Example 1, 2 g of polyvinylidene fluoride, 47 g of N-methylpyrrolidone as a solvent, and 2 g of carbon black as a conductive agent, using a blender to prepare a substantially uniformly dispersed slurry for forming a positive electrode active material layer.

The slurry prepared according to the process above was coated on an aluminum foil using a doctor blade to form a thin electrode plate, and the resultant was dried at 135° C. for more than 3 hours to prepare a positive electrode through rolling and vacuum drying processes.

A 2032 type coin cell was prepared using the positive electrode and a lithium metal counter electrode as a counter electrode. A separator formed of a porous polyethylene (PE) film (thickness: about 16 μm) was positioned between the positive electrode and the lithium metal counter electrode, and an electrolyte solution was injected to prepare the 2032 type coin cell. As the electrolyte solution, a solution containing 1.1 M $LiPF_6$ dissolved in a solvent in which ethylene carbonate (EC) and ethyl methyl carbonate (EMC) were mixed in a volume ratio of 3:5 was used.

PREPARATION EXAMPLES 2 TO 8

Preparation of Coin Cells

A coin cell was prepared in substantially the same manner as in Preparation Example 1, except that the nickel-based active materials prepared according to Examples 2 to 8 were respectively used instead of the nickel-based active material prepared according to Example 1.

COMPARATIVE PREPARATION EXAMPLES 1 to 4

Preparation of Coin Cells

A lithium secondary battery was prepared in substantially the same manner as in Preparation Example 1, except that the nickel-based active material UT bare of Comparative Example 1, the nickel-based active material UT-CO$_3$ of Comparative Example 2, the nickel-based active material UT-Co of Comparative Example 3, and the nickel-based active material UT-CO$_3$—Co of Comparative Example 4 were respectively used instead of the nickel-based active material prepared according to Example 1.

EVALUATION EXAMPLE 1

Scanning Electron Microscopy (SEM)

Scanning electron microscopy (SEM) was performed on surfaces of the nickel-based active material UT bare obtained according to Comparative Example 1, the carbon dioxide surface-treated, nickel-based active material UT-CO$_2$, and the composite positive electrode active material UT-CO$_2$—Co obtained according to Example 1. A Magellan 400L (FEI company) was used as the electron scanning microscope, and analysis results are shown in FIGS. 1A to 1C.

Figure 1B:
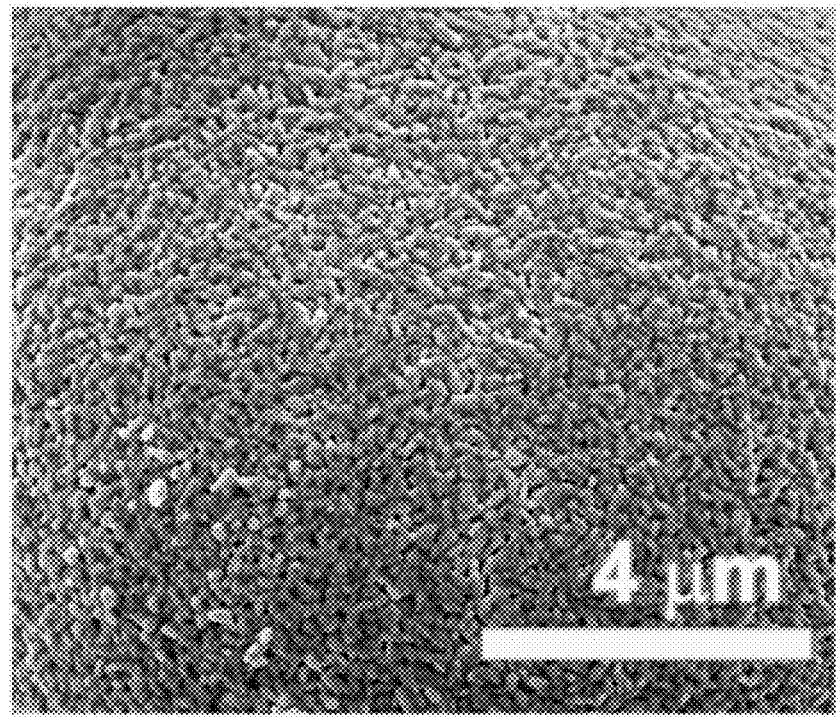
FIG. 1B is an scanning electron image of a nickel-based active material of Comparative Example 1.
Figure 1C:
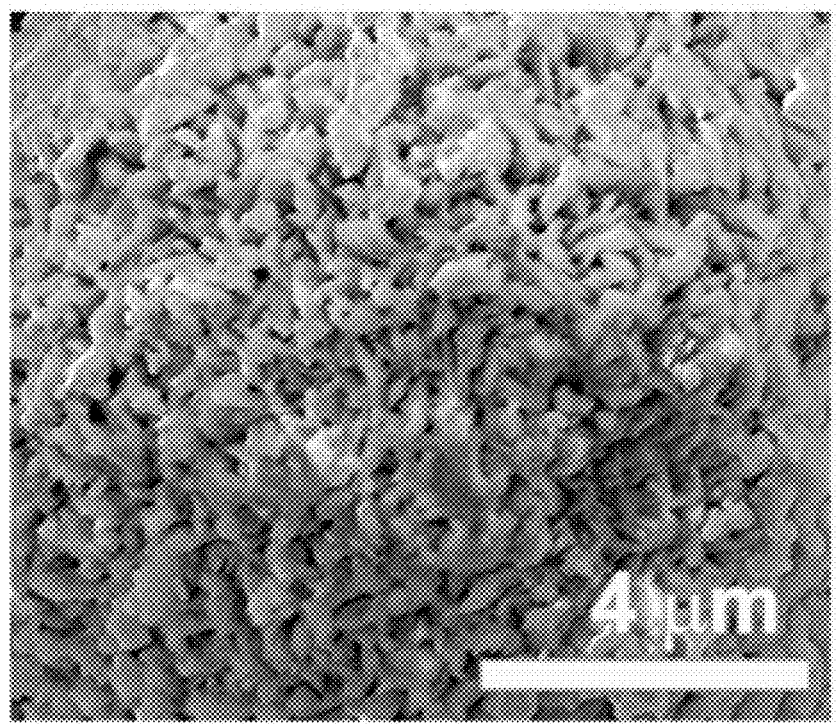
FIG. 1C is an scanning electron image of a carbon dioxide surface-treated, nickel-based active material "UT-$CO_2$".

FIGS. 1A to 1C show the composite positive electrode active material UT-CO$_2$—Co obtained according to Example 1, the nickel-based active material UT bare obtained according to Comparative Example 1, and the carbon dioxide surface-treated nickel-based active material UT-CO$_2$ (e.g., an intermediate in the process of forming Example 1).

It was observed that the nickel-based active material UT-CO$_2$ had a lithium carbonate layer formed on a surface (as shown in FIG. 1C), and the composite positive electrode active material UT-CO$_2$—Co had the entire lithium carbonate layer removed (as shown in FIG. 1A) to have a surface similar to the nickel-based active material UT bare (as shown in FIG. 1B).

EVALUATION EXAMPLE 2

X-Ray Diffraction (XRD) Analysis

X-ray diffraction (XRD) analysis was performed utilizing an X'pert pro (PANalytical) with Cu-K$\alpha$ radiation (1.54056 Å) for the carbon dioxide surface-treated, nickel-based active material UT-CO$_2$ ("UT CO$_2$") and the composite positive electrode active material UT-CO$_2$—Co ("UT CO$_2$—Co") obtained according to Example 1, the nickel-based active material UT-CO$_3$ having the lithium carbonate layer of Comparative Example 2 formed on the surface thereof, and the positive electrode active material UT-CO$_3$—Co of Comparative Example 4.

Figure 2A:
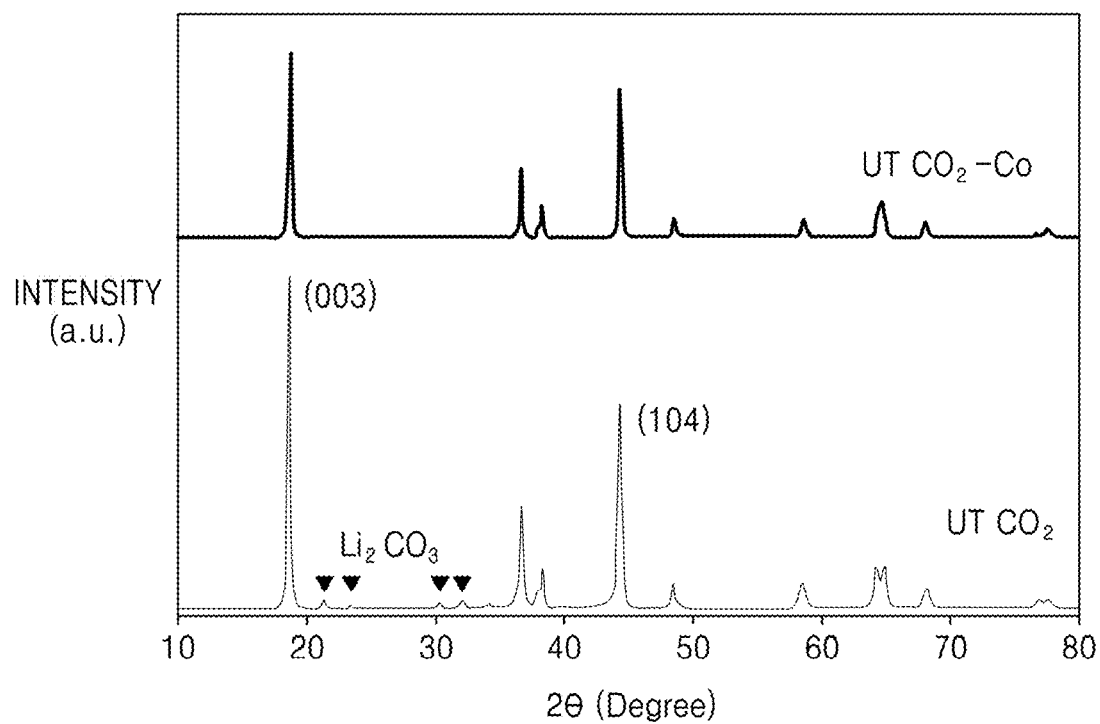
FIG. 2A shows results of X-ray diffraction (XRD) analysis of a carbon dioxide surface-treated, nickel-based active material "UT-$CO_2$" and a composite positive electrode active material "UT-$CO_2$—Co" obtained according to Example 1.
Figure 2B:
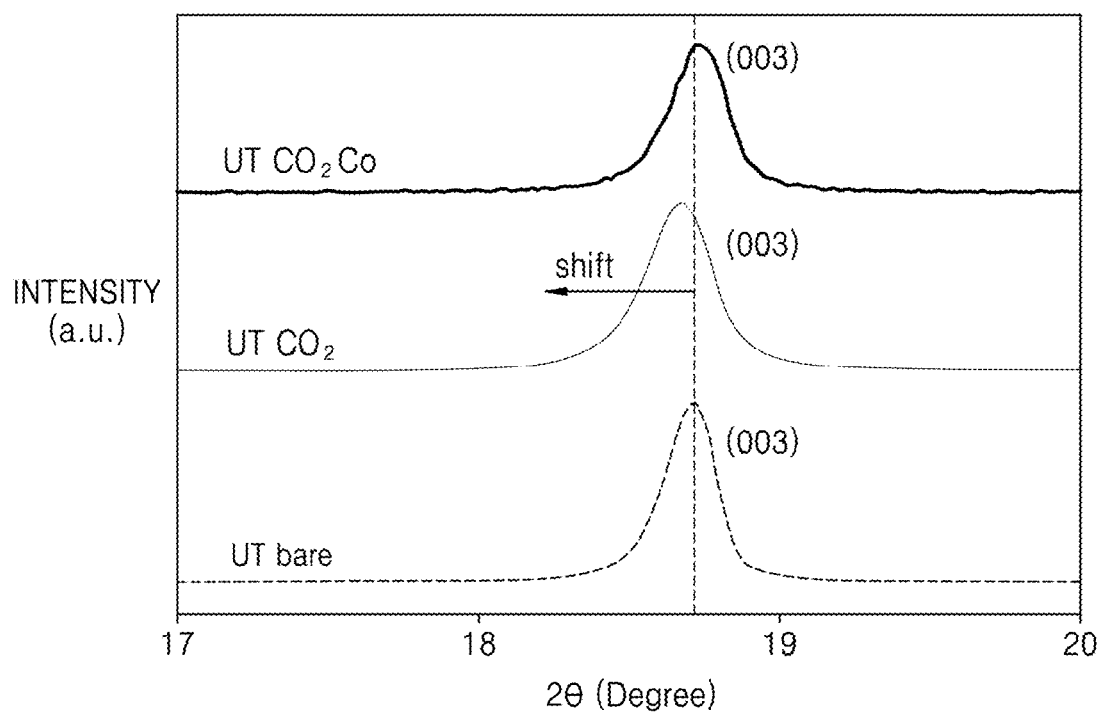
FIG. 2B is an enlarged view of a partial area of FIG. 2A, further including a reference spectrum for a nickel-based active material "UT bare" of Comparative Example 1.

FIGS. 2A and 2B show results of X-ray diffraction analysis of the carbon dioxide surface-treated, nickel-based active material UT-CO$_2$ and the composite positive electrode active material UT-CO$_2$—Co obtained according to Example 1. FIG. 2B is an enlarged view of a partial area of FIG. 2A. FIG. 2B additionally shows the nickel-based active material UT bare of Comparative Example 1 for comparison.

Figure 2C:
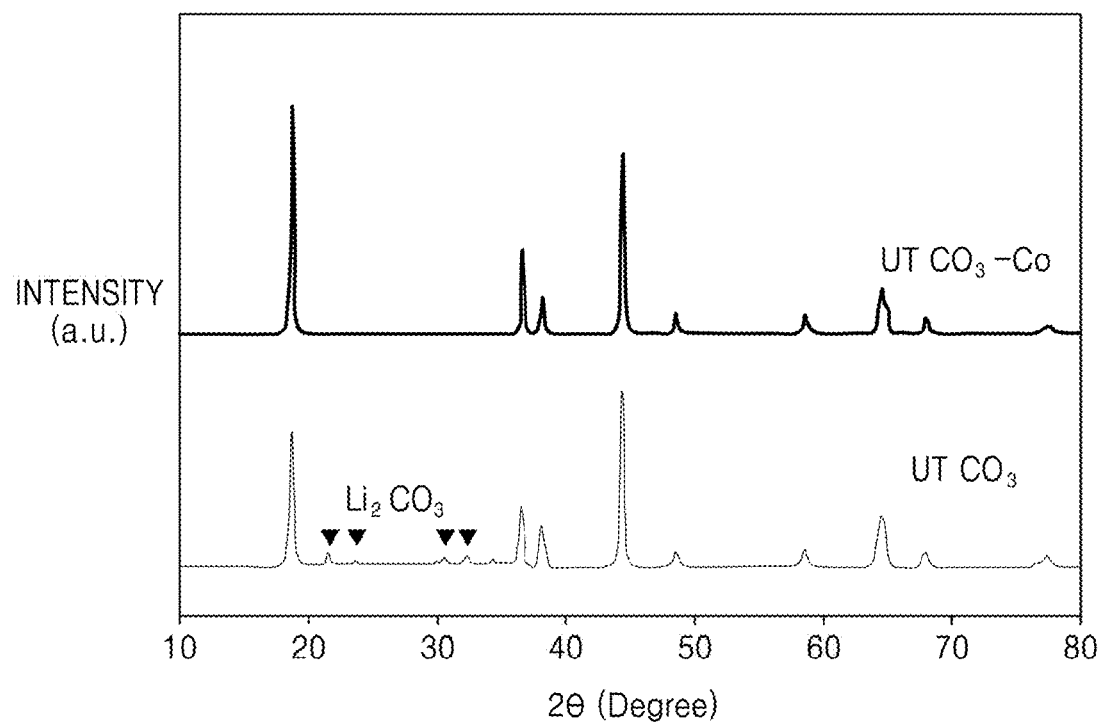
FIG. 2C shows results of X-ray diffraction analysis of a nickel-based active material having a lithium carbonate layer formed on the surface thereof "UT-CO$_3$" of Comparative Example 2, and a positive electrode active material "UT-CO$_3$—Co" of Comparative Example 4.

FIG. 2C shows results of X-ray diffraction analysis of the nickel-based active material UT-CO$_3$ ("UT CO$_3$") having the lithium carbonate layer of Comparative Example 2 formed on the surface thereof, and the positive electrode active material UT-CO$_3$—Co ("UT CO$_3$—Co") of Comparative Example 4.

Referring to FIG. 2A, after carbon dioxide treatment, lithium carbonate was observed in UT-CO$_2$.

Referring to FIG. 2B, it was found that most of the residual lithium in UT-CO$_2$ was in the form of lithium carbonate, and it was observed that the previously existing lithium hydroxide was turned into lithium carbonate and part of the lithium of the nickel-based active material was deintercalated, contributing to lithium carbonate formation, as shown by the peak corresponding to a (003) plane (peak at 2θ of about 18° to 19°) that shifted to a lower angle than UT bare. The XRD spectrum of UT-CO$_2$—Co shows a peaks shift to a higher angle than UT bare.

In contrast, it was found that lithium carbonate was not observed on a surface of the composite positive electrode active material UT-CO$_2$—Co, corresponding to a reduced amount of residual lithium.

Referring to FIG. 2C, unlike UT-CO$_2$—Co described above, the nickel-based active material UT-CO$_3$ having the lithium carbonate layer of Comparative Example 2 formed on the surface thereof had lithium carbonate present at 20° to 30° and a high cation mixing ratio (as shown by I(003)/I(104)) of Table 1), whereas the positive electrode active material UT-CO$_3$—Co of Comparative Example 4 had a reduced amount of lithium carbonate compared to UT-CO$_3$, as the unreacted lithium carbonate reacted with cobalt. However, the positive electrode active material UT-CO$_3$—Co of Comparative Example 4 exhibited a higher cation mixing ratio than the composite positive electrode active material of Example 1. Through scanning electron microscopy analysis, the positive electrode active material UT-CO$_3$—Co of Comparative Example 4 was found to have lithium cobalt oxide present in the form of an island (e.g., lithium cobalt oxide in an island shape was observed by SEM to be on the surface of the positive electrode active material UT-CO$_3$—Co).

The following properties were investigated using the results of the X-ray diffraction analysis of FIGS. 2A to 2C, and are shown in Table 1.

(1) Cation Mixing Ratio

The cation mixing ratio can be derived or observed from the XRD peak intensity ratio ($I_{(003)}/I_{(104)}$) (e.g., intensity ratio of peak corresponding to a (003) plane (peak at 2θ of about 18° to 19°) and a peak corresponding to a (104) plane (peak at 2θ of about 44.5°)).

For example, $I_{(003)}$ refers to the intensity of the peak corresponding to the (003) plane, and $I_{(104)}$ refers to the peak corresponding to the (104) plane. The peak corresponding to the (003) plane provides information on a layered structure of the positive electrode active material, and the peak corresponding to the (104) plane provides information on a layered and cubic rock-salt structure (e.g., the height of each peak is proportional to the concentration of the phase in the sample). The greater the $I_{(003)}/I_{(104)}$, the smaller the cation mixing ratio.

TABLE 1

| Type | Name of sample | ($I_{(003)}/I_{(104)}$) |
|---|---|---|
| Example 1 | UT-CO$_2$ | 1.30 |
|  | UT-CO$_2$—Co | 1.34 |
| Comparative Example 2 | UT-CO$_3$ | 0.77 |
| Comparative Example 4 | UT-CO$_3$—Co | 1.28 |

As shown in Table 1 above, the composite positive electrode active material UT-CO$_2$—Co of Example 1 had increased I(003)/I(104) compared to the positive electrode active material of Comparative Example 4, consistent with a reduced cation mixing ratio. Accordingly, it was found that high capacity may be achieved using the composite positive electrode active material of Example 1.

(2) Residual Lithium

Figure 3A:
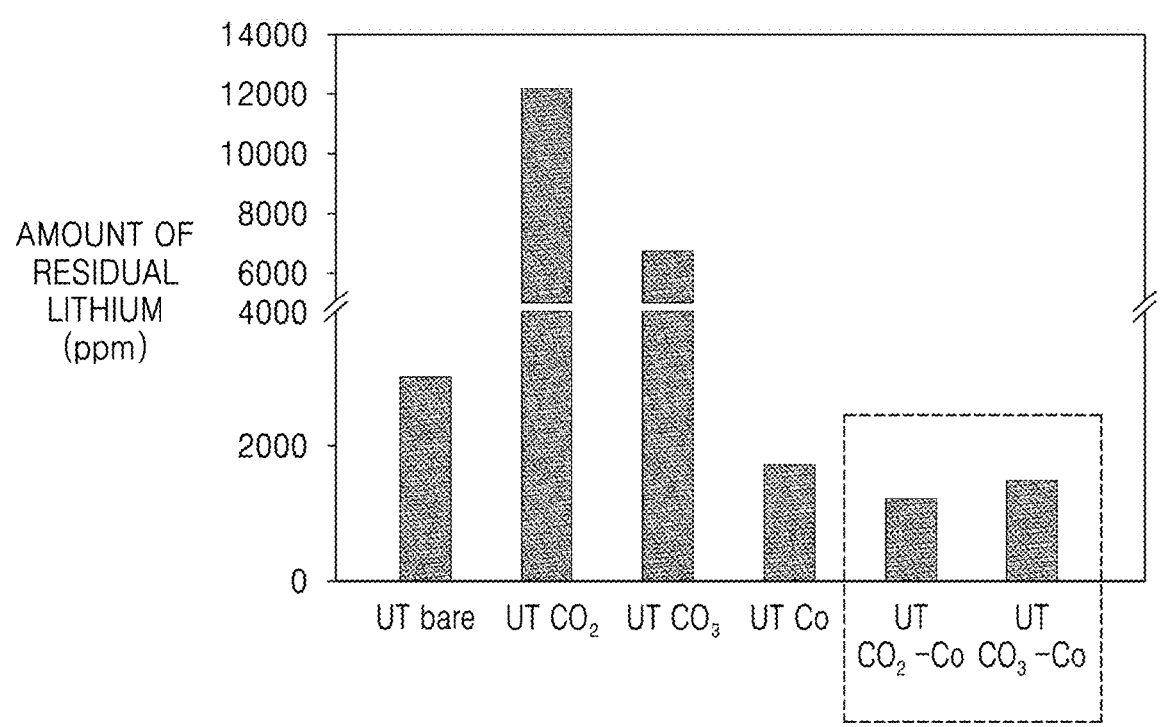
FIG. 3A shows the amounts of residual lithium in the composite positive electrode active materials "UT-CO$_2$—Co" (Example 1), "UT-CO$_2$", "UT bare" (Comparative Example 1), "UT-CO$_3$" (Comparative Example 2), "UT-Co" (Comparative Example 3), and "UT-CO$_3$—Co" (Comparative Example 4).
Figure 3B:
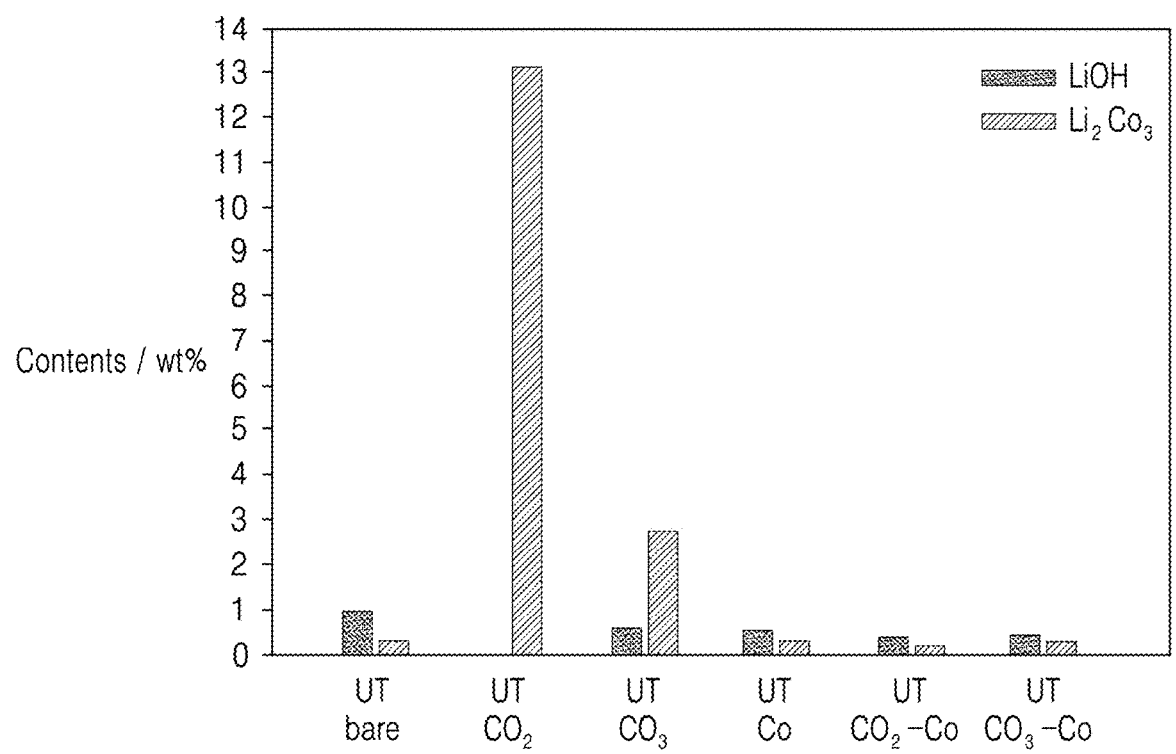
FIG. 3B shows the amounts of residual lithium carbonate and residual lithium hydroxide in the composite positive electrode active materials "UT-CO$_2$—Co" (Example 1), "UT-CO$_2$", "UT bare" (Comparative Example 1), "UT-CO$_3$" (Comparative Example 2), "UT-Co" (Comparative Example 3), and "UT-CO$_3$—Co" (Comparative Example 4) of Example 1.

The amount of residual lithium was measured through an acid-base titration method by adding 50 g of the prepared active material and 100 ml of ultrapure water to a beaker, stirring the active material and the pure water, then separating the stirred solution from any powder (e.g., separating the suspended solids from the solution) using a filter paper, and then performing pH titration on the resultant solution using 0.1N hydrochloric acid (e.g., to titrate the dissolved lithium hydroxide and lithium carbonate). The measured amounts of lithium hydroxide and lithium carbonate are shown in FIGS. 3A and 3B and Table 2 below. FIG. 3A shows the amount of residual lithium, and FIG. 3B shows the amounts of lithium carbonate and lithium hydroxide.

TABLE 2

| Type | Name of sample | Lithium carbonate (% by weight) | Lithium hydroxide (% by weight) |
|---|---|---|---|
| Example 1 | UT-CO$_2$ | 13.161 | 0.002 |
|  | UT-CO$_2$—Co | 0.204 | 0.361 |
| Comparative Example 1 | UT bare | 0.286 | 0.957 |
| Comparative Example 2 | UT-CO$_3$ | 2.725 | 0.554 |
| Comparative Example 3 | UT-Co | 0.276 | 0.508 |
| Comparative Example 4 | UT-CO$_3$—Co | 0.288 | 0.426 |

Referring to Table 2, it was found that the composite positive electrode active material UT-CO$_2$—Co of Example 1 had the most reduced (e.g., smallest) amount of residual lithium carbonate compared to CO$_2$, UT bare, UT-CO$_3$, UT-Co, and UT-CO$_3$—Co. In addition, as shown in FIG. 3A, it was found that the composite positive electrode active material UT-CO$_2$—Co of Example 1 had a reduced amount of residual lithium compared to UT-CO$_2$, UT bare, UT-CO$_3$, UT-Co, and UT-CO$_3$—Co. Further, as shown in FIG. 3B, it was found that the composite positive electrode active material UT-CO$_2$—Co of Example 1 had the smallest amount of residual lithium hydroxide as the residual lithium carbonate.

EVALUATION EXAMPLE 3

Time-Of-Flight Secondary Ion Mass Spectrometry (TOF-SIMS)

Figure 4A:
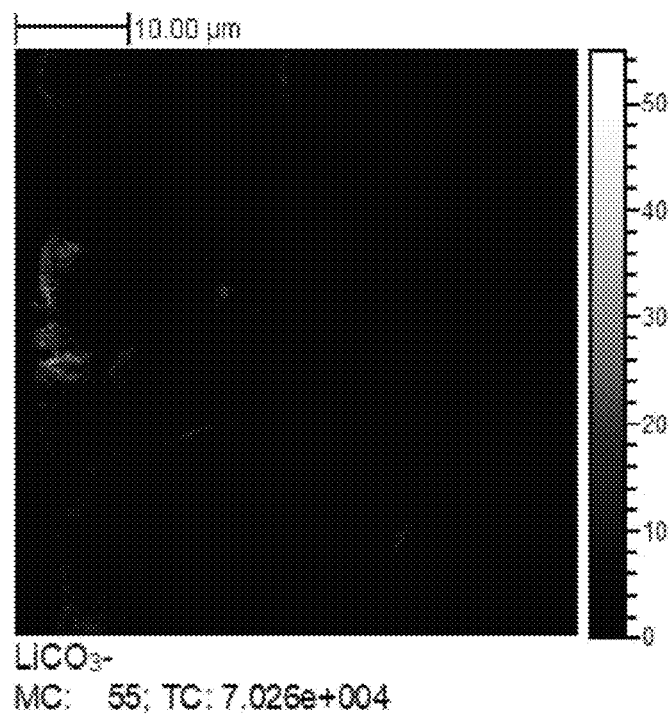
FIG. 4A shows time-of-flight secondary ion mass spectrometry (TOF-SIMS) chemical mapping results for a surface of the nickel-based active material of UT bare.
Figure 4B:
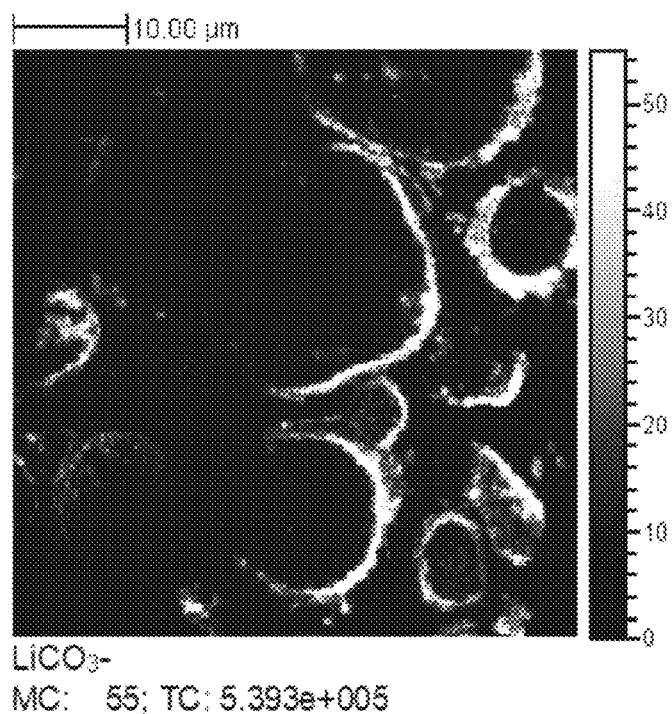
FIG. 4B shows TOF-SIMS mapping results for a surface of the carbon dioxide surface-treated UT-CO$_2$ from the preparation of Example 1.
Figure 4C:
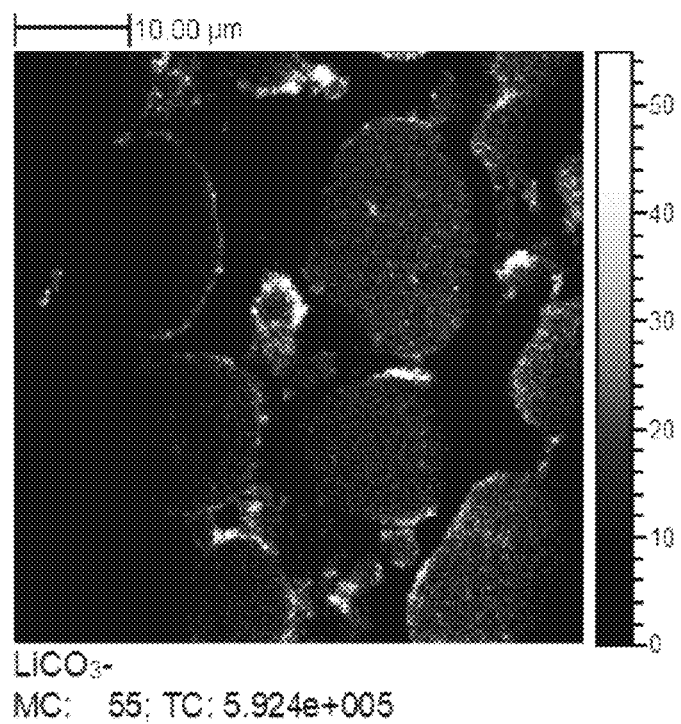
FIG. 4C shows results of TOF-SIMS mapping for a surface of UT-CO$_2$—Co of Example 1.
Figure 4D:
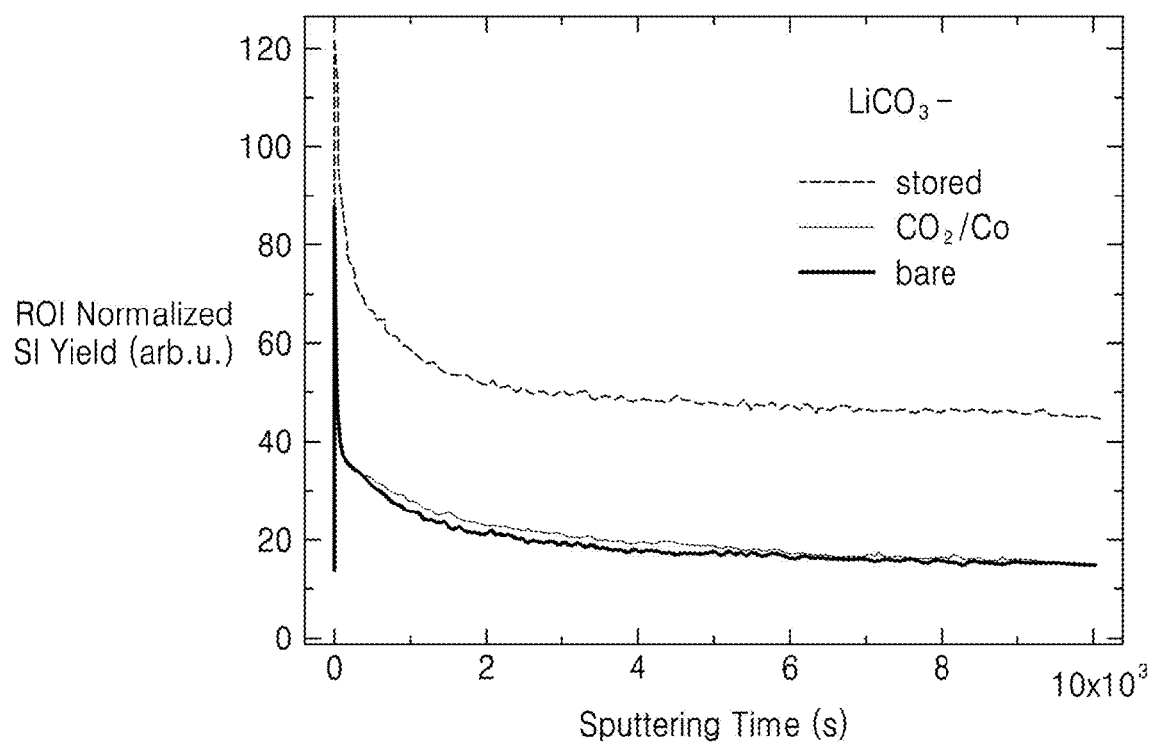
FIGS. 4D and 4E show TOF-SIMS depth profiles of LiCO$_3$— and CoO$_2$— in analyte particles, where bare, Co$_2$/Co, and stored refer to UT bare, UT-CO$_2$—Co, and UT CO$_2$, respectively.
Figure 4E:
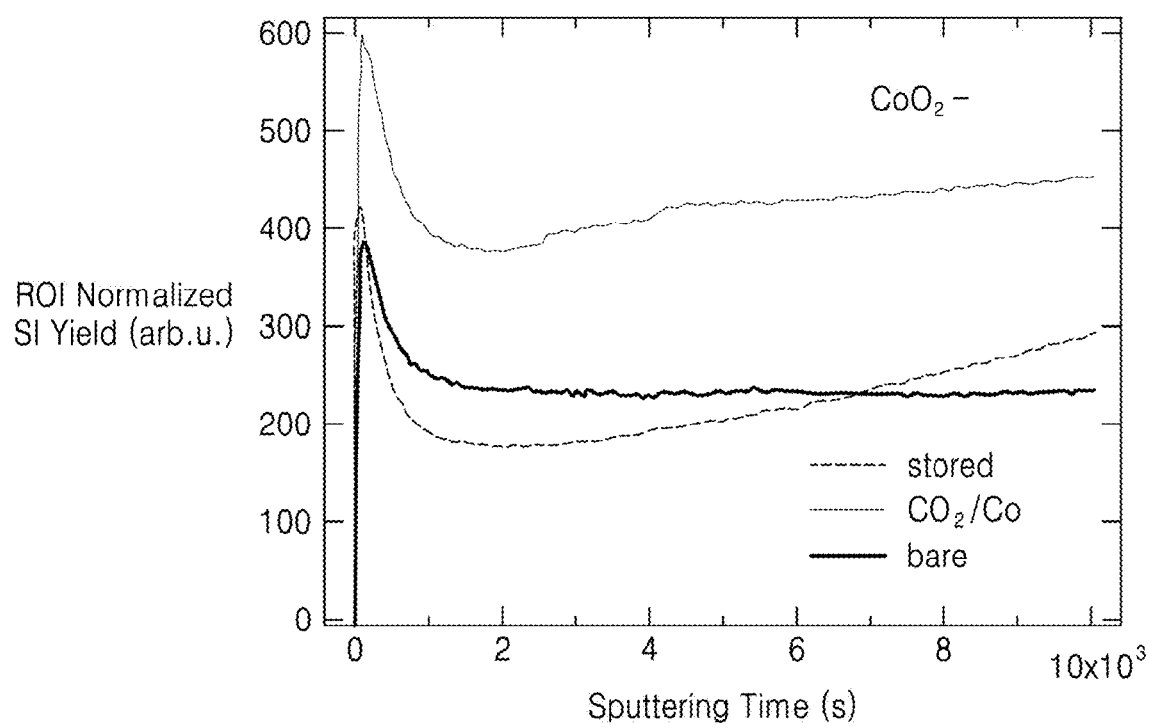

TOF-SIMS evaluation was performed on UT bare, UT CO$_2$, and UT-CO$_2$—Co. TOF-SIMS analysis was performed using an Ion TOF5 from Ion TOF. The TOF-SIMS analysis was performed under the conditions of primary ion: Bi$^{1+}$ and sputter ion: Cs$^+$. The TOF-SIMS spectra are shown in FIGS. 4A to 4E. FIG. 4A shows the TOF-SIMS chemical mapping results of a surface for the nickel-based active material UT bare, and FIG. 4B shows the TOF-SIMS chemical mapping results of a surface for the UT-CO$_2$. In addition, FIG. 4C shows the TOF-SIMS mapping results of a surface for UT-CO$_2$—Co. Further, FIGS. 4D and 4E show depth profiles. In FIGS. 4D and 4E, bare, CO$_2$/Co and stored represent UT bare, UT-CO$_2$—Co, and UT CO$_2$, respectively.

As shown in FIG. 4A, LiCO$_3$— was barely observed in UT bare. As shown in FIG. 4B, UT CO$_2$ was clearly observed to have LiCO$_3$— on a surface of an active material.

As shown in FIG. 4C, UT CO$_2$—Co was observed to have a reduced LiCO$_3$— on the surface thereof after cobalt surface treatment. In addition, as shown in FIGS. 4D and 4E, it was found that UT CO$_2$ had the thickest layer of LiCO$_3^-$, and UT-CO$_2$—Co had a cobalt-based material CoO$_2^-$ in a surface layer after cobalt surface treatment.

EVALUATION EXAMPLE 4

TEM-EDX Analysis

Transmission electron microscopy-energy dispersion X-ray spectroscopy (TEM-EDX) was performed on the composite positive electrode active material of Example 1.

Figure 5:
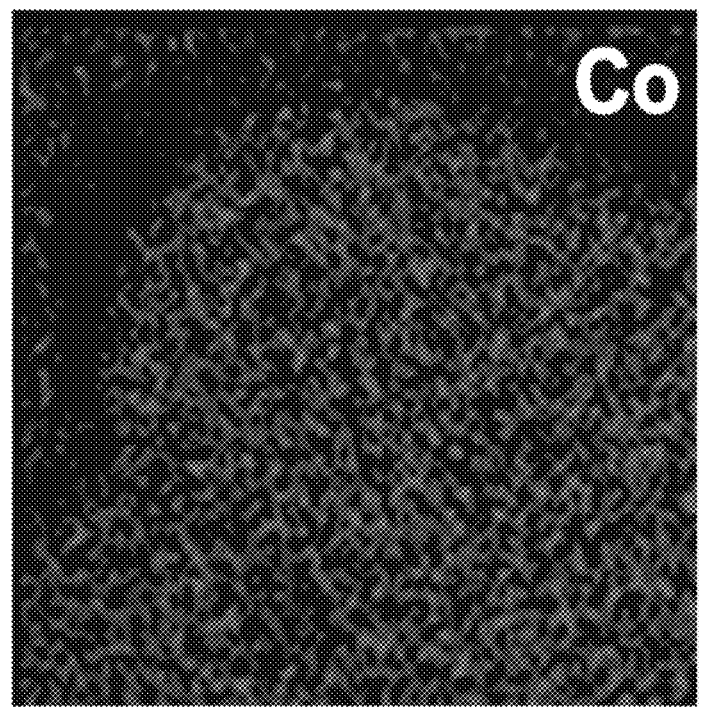
FIG. 5 shows results of transmission electron microscopy-energy dispersive X-ray spectroscopy (TEM-EDX) for the composite positive electrode active material of Example 1.

The analysis results are shown in FIG. 5.

Referring to FIG. 5, in the composite positive electrode active material of Example 1, cobalt (Co) was detected as a component of a film.

EVALUATION EXAMPLE 5

Charge/Discharge Properties

The coin cells prepared according to Preparation Example 1 and Comparative Preparation Example 1 were charged and discharged once at 25° C. and 0.1 C to perform formation. Thereafter, charging/discharging was performed once at 0.1 C to examine the initial charge/discharge properties. Charging was set to start in a CC (constant current) mode, and then switch to a CV (constant voltage) mode to be cut off at 4.35 V and 0.05 C, and discharging was set to be cut off at 3.0 V in a CC (constant current) mode. Charge/discharge properties were examined, some of which are shown in FIG. 6, and charge/discharge efficiency properties were examined.

The charge/discharge efficiency evaluation shows that the charge/discharge efficiency of the coin cell of Comparative Preparation Example 1 (Bare) was 91.43% whereas the charge/discharge efficiency of the coin cell of Preparation Example 1 (CO$_2$/Co) was further improved at 92.92%.

Figure 6:
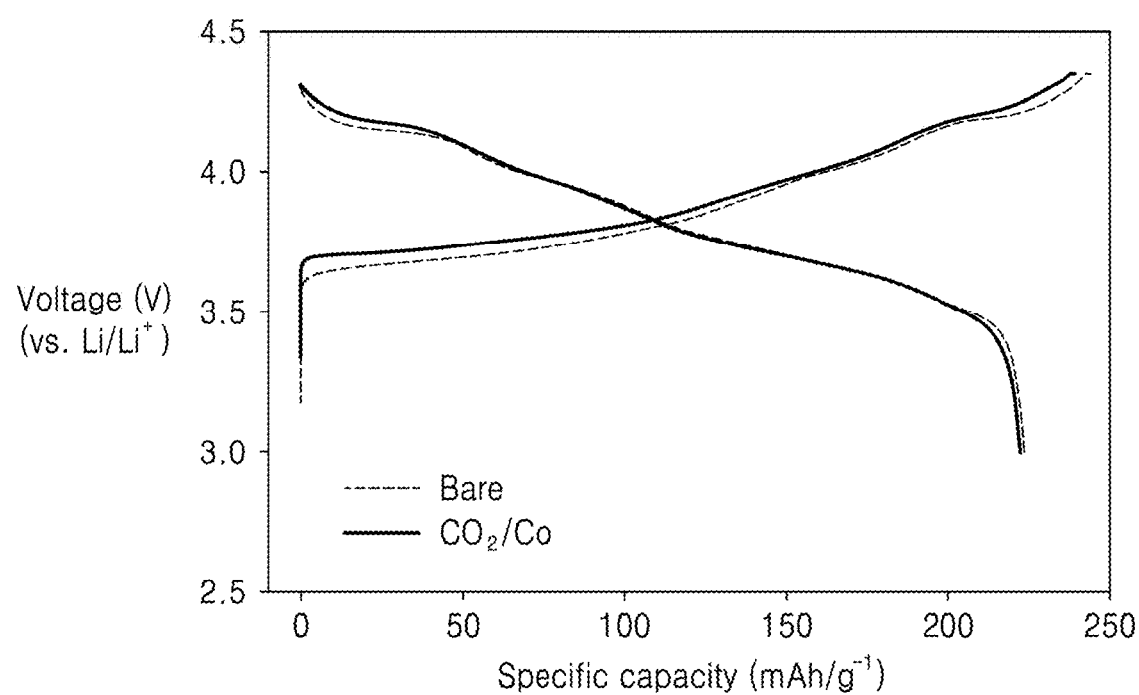
FIG. 6 is a charge/discharge curve plot for the coin cells of Preparation Example 1 and Comparative Preparation Example 1.

In addition, FIG. 6 shows voltage changes according to specific capacity in the coin cells prepared according to Preparation Example 1 and Comparative Preparation Example 1.

Referring to FIG. 6, the coin cell charge/discharge properties of Preparation Example 1 were superior to the coin cell charge/discharge properties of Comparative Preparation Example 1.

In addition, the charge/discharge properties of the coin cells prepared according to Preparation Examples 2 to 8 were evaluated in substantially the same manner as the coin cell of Preparation Example 1 described above.

The evaluation shows that the coin cells of Preparation Examples 2 to 8 exhibited substantially the same level of charge/discharge properties as the coin cell of Preparation Example 1.

Evaluation Example 6

Charge/Discharge Properties

In the coin half-cells prepared according to Preparation Examples 1 and 6 to 8 and Comparative Preparation Example 1, charge/discharge properties, etc. were evaluated utilizing a charge/discharge regulator (manufacturer: TOYO, model: TOYO-3100).

In first charging and discharging, the coin half-cells were constant-current (CC) charged up to 4.35 V with a current of 0.1 C at 30° C., and then constant-voltage (CV) charged up to a current of 0.05 C. The cells in which the charging was completed were subjected to a pause period of about 10 minutes, and then constant-current discharged down to 3 V with a current of 0.1 C. In the second charge/discharge cycle, the coin half-cells were constant-current (CC) charged up to 4.35 V with a current of 0.2 C, and then constant-voltage (CV) charged up to a current of 0.05 C. The cells in which the charging was completed were subjected to a pause period of about 10 minutes, and then constant-current (CC) discharged up to 3 V with a current of 0.2 C.

Figure 7:
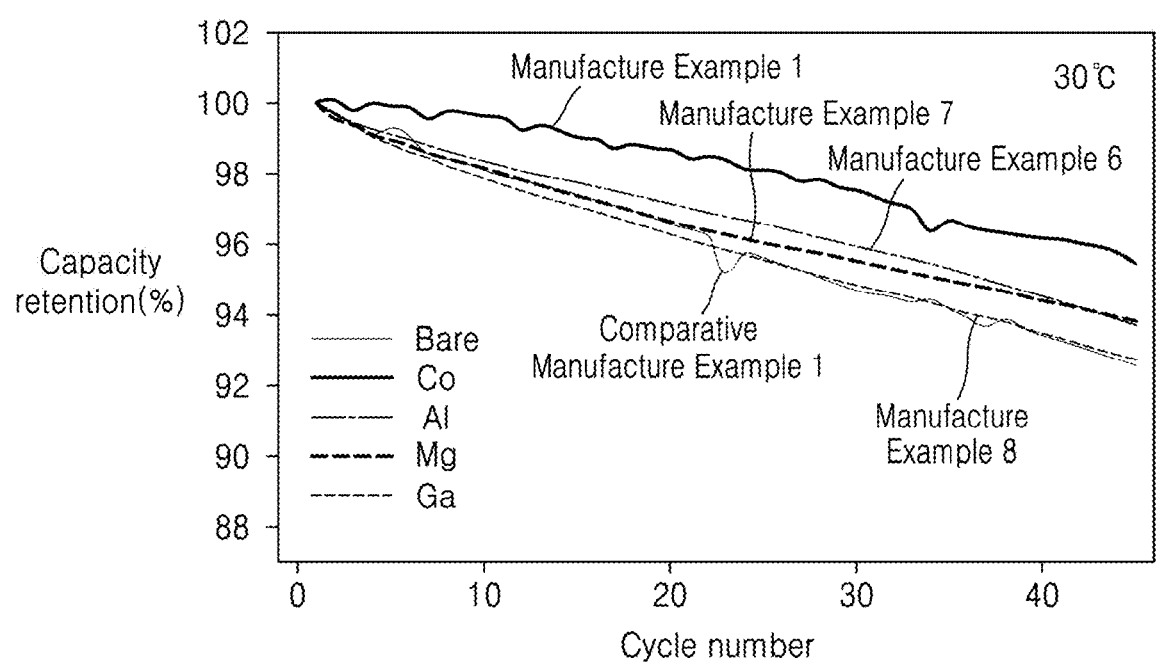
FIG. 7 is a capacity retention (lifespan) plot of the coin cells of Preparation Examples 1 and 6 to 8 and Comparative Preparation Example 1.

In lifespan evaluation, the coin half-cells were constant-current (CC) charged up to 4.35 V with a current of 1 C, and then constant-voltage (CV) charged up to a current of 0.05 C. The cells in which the charging was completed were subjected to a pause period of about 10 minutes, and then a cycle of performing constant-current discharging was repeated 50 times on the cells until a voltage reaches 3 V with a current of 1 C. The experimental results are shown in FIG. 7. Capacity retention ratios (CRR) were calculated using Equation 2:

Capacity retention ratio[%]=[discharge capacity at 300th cycle/discharge capacity at 1st cycle]×100    Equation 2

Referring to FIG. 7, it was found that the coin cells prepared according to Preparation Examples 1 and 6 to 8 had generally improved capacity retention ratios compared to the coin cell prepared according to Comparative Preparation (Manufacture) Example 1 (Bare).

A positive electrode active material for a lithium secondary battery according to an aspect may have a reduced amount of residual lithium, have a coating layer formed in a large area, and be substantially uniformly in contact with a nickel-based active material. Using such a positive electrode active material, a lithium secondary battery having improved capacity properties may be prepared.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope of the disclosure as defined by the following claims and equivalents thereof.

What is claimed is:

1. A method of preparing a composite positive electrode active material for a lithium secondary battery, the method comprising:
   surface-treating a nickel-based active material utilizing carbon dioxide to form a lithium carbonate layer on the surface of the nickel-based active material;
   mixing the nickel-based active material having the lithium carbonate layer on the surface thereof with a metal precursor comprising at least one metal selected from cobalt (Co), aluminum (Al), magnesium (Mg), and gallium (Ga) to prepare a mixture; and
   heat-treating the mixture.

2. The method of claim 1, wherein the carbon dioxide is provided at a concentration of 1 wt % to 10 wt %, and a flow rate of 0.1 L/min to 1 L/min.

3. The method of claim 1, wherein the metal precursor is cobalt hydroxide, cobalt chloride, cobalt sulfate, cobalt oxide, magnesium hydroxide, magnesium chloride, magnesium sulfate, magnesium oxide, aluminum hydroxide, aluminum chloride, aluminum sulfate, aluminum oxide, gallium nitrate, gallium hydroxide, gallium chloride, gallium sulfate, gallium oxide, or a combination thereof.

4. The method of claim 1, wherein the heat-treating the mixture is performed at about 600° C. to about 750° C. in an air or oxygen atmosphere.

5. The method of claim 1, wherein the lithium carbonate layer is in the form of a substantially continuous coating layer on the surface of the nickel-based active material.

6. The method of claim 1, wherein the surface-treating the nickel-based active material utilizing carbon dioxide to form the lithium carbonate layer on the surface of the nickel-based active material is performed at about 30° C. to about 60° C.

7. A composite positive electrode active material for a lithium secondary battery comprising:
   a nickel-based active material and a coating layer comprising at least one metal material comprising cobalt, aluminum, magnesium, and/or gallium on a surface of the nickel-based active material,
   wherein the composite positive electrode active material is obtained by: surface-treating the nickel-based active material utilizing carbon dioxide to form a lithium carbonate layer on a surface of the nickel-based active material; mixing the nickel-based active material having the lithium carbonate layer on the surface thereof with a metal precursor comprising at least one selected from cobalt (Co), aluminum (Al), magnesium (Mg), and gallium (Ga) to prepare a mixture; and heat-treating the mixture,
and
wherein an amount of lithium carbonate in the composite positive electrode active material is about 0.3 wt % or less.

8. The composite positive electrode active material of claim 7, wherein the coating layer is in the form of a substantially continuous coating layer.

9. The composite positive electrode active material of claim 7,
wherein the metal material comprises cobalt metal, cobalt oxide, lithium cobalt oxide, aluminum metal, aluminum oxide, lithium aluminum oxide, magnesium metal, magnesium oxide, lithium magnesium oxide, gallium metal, gallium oxide, lithium gallium oxide, or a combination thereof.

10. The composite positive electrode active material of claim 7, wherein an amount of the metal material is about 1 mol % to about 20 mol % with respect to 100 mol % of the total amount of the composite positive electrode active material.

11. The composite positive electrode active material of claim 7, wherein the nickel-based active material is a compound represented by Formula 1:

$$Li_a(Ni_{1-x-y-z}Co_xM1_yM2_z)O_{2\pm\alpha 1}, \text{ and} \qquad \text{Equation 1}$$

wherein, in Formula 1, M1 is manganese, aluminum, or a combination thereof,
M2 is selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr), and
$0.95 \leq a \leq 1.1$, $0.3 \leq (1-x-y-z) < 1$, $0 < x < 1$, $0 \leq y < 1$, $0 \leq z < 1$, and $0 \leq \alpha 1 \leq 0.1$.

12. The composite positive electrode active material of claim 7, wherein, an X-ray diffraction peak intensity ratio ($I_{(003)}/I_{(104)}$) of the composite positive electrode active material is 1.3 or greater.

13. The composite positive electrode active material of claim 7, wherein the lithium carbonate layer is present in the form of a substantially continuous coating layer on the surface of the nickel-based active material.

14. A positive electrode for a lithium secondary battery comprising:
the composite positive electrode active material for a lithium secondary battery of claim 7.

15. The positive electrode of claim 14, wherein the coating layer is in the form of a substantially continuous coating layer.

16. The positive electrode of claim 14, wherein the metal material comprises cobalt metal, cobalt oxide, lithium cobalt oxide, aluminum metal, aluminum oxide, lithium aluminum oxide, magnesium metal, magnesium oxide, lithium magnesium oxide, gallium metal, gallium oxide, lithium gallium oxide, or a combination thereof.

17. The positive electrode of claim 14, wherein an amount of the metal material is about 1 mol % to about 20 mol % with respect to 100 mol % of the total amount of the composite positive electrode active material.

18. The positive electrode of claim 14, wherein the nickel-based active material is a compound represented by Formula 1:

$$Li_a(Ni_{1-x-y-z}Co_xM1_yM2_z)O_{2\pm\alpha 1}, \text{ and} \qquad \text{Equation 1}$$

wherein, in Formula 1, M1 is manganese, aluminum, or a combination thereof,
M2 is selected from the group consisting of boron (B), magnesium (Mg), calcium (Ca), strontium (Sr), barium (Ba), titanium (Ti), vanadium (V), chromium (Cr), iron (Fe), copper (Cu), and zirconium (Zr), and
$0.95 \leq a \leq 1.1$, $0.3 \leq (1-x-y-z) < 1$, $0 < x < 1$, $0 \leq y < 1$, $0 \leq z < 1$, and $0 \leq \alpha 1 \leq 0.1$.

19. The positive electrode of claim 14, wherein, an X-ray diffraction peak intensity ratio ($I_{(003)}/I_{(104)}$) of the composite positive electrode active material is 1.3 or greater.

20. A lithium secondary battery comprising: the positive electrode of claim 14, a negative electrode, and an electrolyte positioned between the positive electrode and the negative electrode.

* * * * *